(12) United States Patent  
Stamm

(10) Patent No.: US 6,175,470 B1  
(45) Date of Patent: Jan. 16, 2001

(54) STORAGE MEDIUM CARTRIDGE HAVING AN INTEGRAL KEY

(75) Inventor: Stephen Stamm, Fort Lupton, CO (US)

(73) Assignee: Quantum Corp., Milpitas, CA (US)

( * ) Notice: Under 35 U.S.C. 154(b), the term of this patent shall be extended for 0 days.

(21) Appl. No.: 09/244,238

(22) Filed: Feb. 3, 1999

(51) Int. Cl.[7] .................................................. G11B 23/02
(52) U.S. Cl. ............................................................ 360/132
(58) Field of Search .................................. 360/132, 133; 369/291

(56) References Cited

U.S. PATENT DOCUMENTS 5,828,534 * 10/1998 Lou ........................................ 360/132
5,906,324 * 5/1999 Adams et al. ........................ 360/132

* cited by examiner

Primary Examiner—Allen T. Cao
(74) Attorney, Agent, or Firm—Steven G. Roeder

(57) ABSTRACT

A magnetic tape cartridge having an integral key is provided for use within a magnetic tape drive having a tape cartridge guide assembly adapted for use with the integral key. The integral key is defined on the exterior of the cartridge housing and comprises a raised fixture or tab. The tape cartridge guide assembly includes at least one slit portion. During use, the tape cartridge having the integral key is inserted into the tape drive, the integral key is aligned and permitted to traverse the slit portion for enabling the cartridge to enter the subsystem.

21 Claims, 4 Drawing Sheets

STORAGE MEDIUM CARTRIDGE HAVING AN INTEGRAL KEY

FIELD OF THE INVENTION

The invention relates generally to digital data storage, and more particularly to digital data storage systems which use a removable cartridge to hold the storage media.

BACKGROUND OF THE INVENTION

Digital data storage systems are known. In particular, digital tape recording systems employing a single-reel tape cartridge are known. In one known system for digital data storage as shown in FIG. 1, a magnetic tape drive uses a single-reel tape cartridge 22. A tape drive 10 is generally comprised of a rectangular housing 30 that has a common base 18 carrying two spindle motors. A first spindle motor 15 rotates a permanently mounted take-up reel 14 dimensioned to accept a relatively high speed streaming magnetic tape 20. A second spindle 25 is adapted to rotate a feed reel 24 of the single-reel removable tape cartridge 22. The removable tape cartridge 22 is manually or automatically inserted into tape drive 10 via a suitably-dimensioned slot 32 formed in the drive's housing 30. Upon insertion of the tape cartridge 22 into the slot, the cartridge tape feed reel 24 becomes engaged by the second spindle motor 25. Prior to synchronized rotation of the first spindle motor 15 and second spindle motor 25, the tape cartridge leader becomes automatically buckled to a drive take-up leader extending from the take-up reel 14 along the tape path 26 within the drive 10. Newer versions of the tape drive 10 use a different buckling mechanism to join the cartridge leader to the take-up leader. Cartridges using the newer buckling mechanism cannot be used in older systems, because the cartridge leader in the newer cartridges will not successfully mate with the take-up leader of older tape drives.

In the event that a tape cartridge designed for use in a newer tape drive is inserted into a tape drive 10 having an older buckling mechanism, the cartridge leader and the take-up leader associated with the older buckling mechanism will not successfully buckle. As a result, the take-up leader will disengage from the buckling mechanism and spool on to the take-up reel 14. Further, the take-up leader will spool on to the take-up reel without magnetic tape 20 from the tape cartridge 22 being connected thereto. This condition is known as take-up leader run away. A technician is typically required to service a tape drive 10 that has been subjected to a leader run away condition in order to re-position the take-up leader on the buckling assembly.

In newer tape drives enhanced read/write head structures and data processing electronics are capable of storing and processing increased lineal track and bit densities on the magnetic tapes. If a tape cartridge employing these increased lineal track and bit densities is used with an older tape drive that does not incorporate the enhanced head structures and data processing electronics, the data previously stored on the cartridge will be overwritten and erased. As a result, tape cartridges that are recorded with these increased lineal track and bit densities are not backwards compatible with older tape drives that do not employ the enhanced read/write head structures and data processing electronics.

The problem can be stated generally in a simple manner: newer cartridges are not compatible with earlier tape drives. However, older cartridges need to be compatible for use with newer tape drives, as the archival data stored on older cartridges may be needed long after the older tape drive has been replaced by a newer model.

Recently, most manufactures of tape drives and their components agreed upon a standard form factor for cartridges produced by cartridge manufacturers. As a result, however, the form factor of one family of storage medium cartridges cannot be appreciably modified to distinguish older cartridges from newer cartridges without violating the standard. Therefore, the above described compatibility problems associated with storage medium cartridges employing the positive engagement buckling mechanism and/or the enhanced read/write head structures and data processing electronics cannot be alleviated by simply changing the form factor of the cartridge.

Therefore, a need exists for a new tape cartridge that has the same form factor as an older tape cartridge, but which cannot be inserted into or used with older tape drives. At the same time, whatever modification is made to prevent the usage of new cartridges in old drives cannot prevent the use of old cartridges in new tape drives.

SUMMARY OF THE INVENTION

In a first embodiment of the present invention, a tape cartridge having an integral key for preventing the cartridge from being inadvertently inserted into an older tape drive having a non-compatible buckling mechanism, read/write head structure or data processing electronics is described.

The integral key permits the cartridge to be inserted into new, compatible tape drives, with a matching lock fixture. The same lock fixture in new tape drives does not prevent the insertion and use of earlier model tape cartridges.

In the first preferred embodiment, the magnetic tape cartridge includes a substantially rectangular cartridge housing having an integral key formed on the exterior surface thereof. The integral key is a rectangular tab or protrusion extending outwardly from the cartridge housing. The tape cartridge further includes at least one tape supply reel rotatably contained within the cartridge housing. A spool of magnetic tape is coiled about the supply reel and is used for storing information thereon. The tag end of the magnetic tape is attached to one end of a cartridge tape leader. Another end of the cartridge tape leader is attached to a buckling component that is adapted to cooperate with a positive engagement buckling mechanism. The buckling component and magnetic tape attached thereto are accessed via a pivotal door defined on the cartridge housing.

The tape cartridge guide assembly is defined within the tape drive and cooperates with the integral key so that a cartridge having the key can be inserted into the drive. In particular, the cartridge guide assembly includes a slit portion that aligns with the integral key defined on the cartridge when the cartridge is inserted into the subsystem. As a result, the integral key traverses the slit portion during insertion into the tape drive. The tape cartridge having the integral key cannot be inserted into non-compatible tape drives because the integral key strikes the cartridge guide assembly of the non-compatible tape drive. As that guide assembly has no slit portion, further insertion of the cartridge is impossible. Tape cartridges associated with these non-compatible tape drives can be used with new tape drives. This is possible because the slit portion defined on the cartridge guide assembly of new tape drives does not block cartridges that do not have the integral key from entering the tape drive.

These and other objects, advantages, aspects and features of the present invention will be more fully understood and appreciated upon consideration of the following detailed description of a preferred embodiment, presented in conjunction with the accompanying drawings.

DETAILED DESCRIPTION OF A PREFERRED EMBODIMENT

Figure 1:
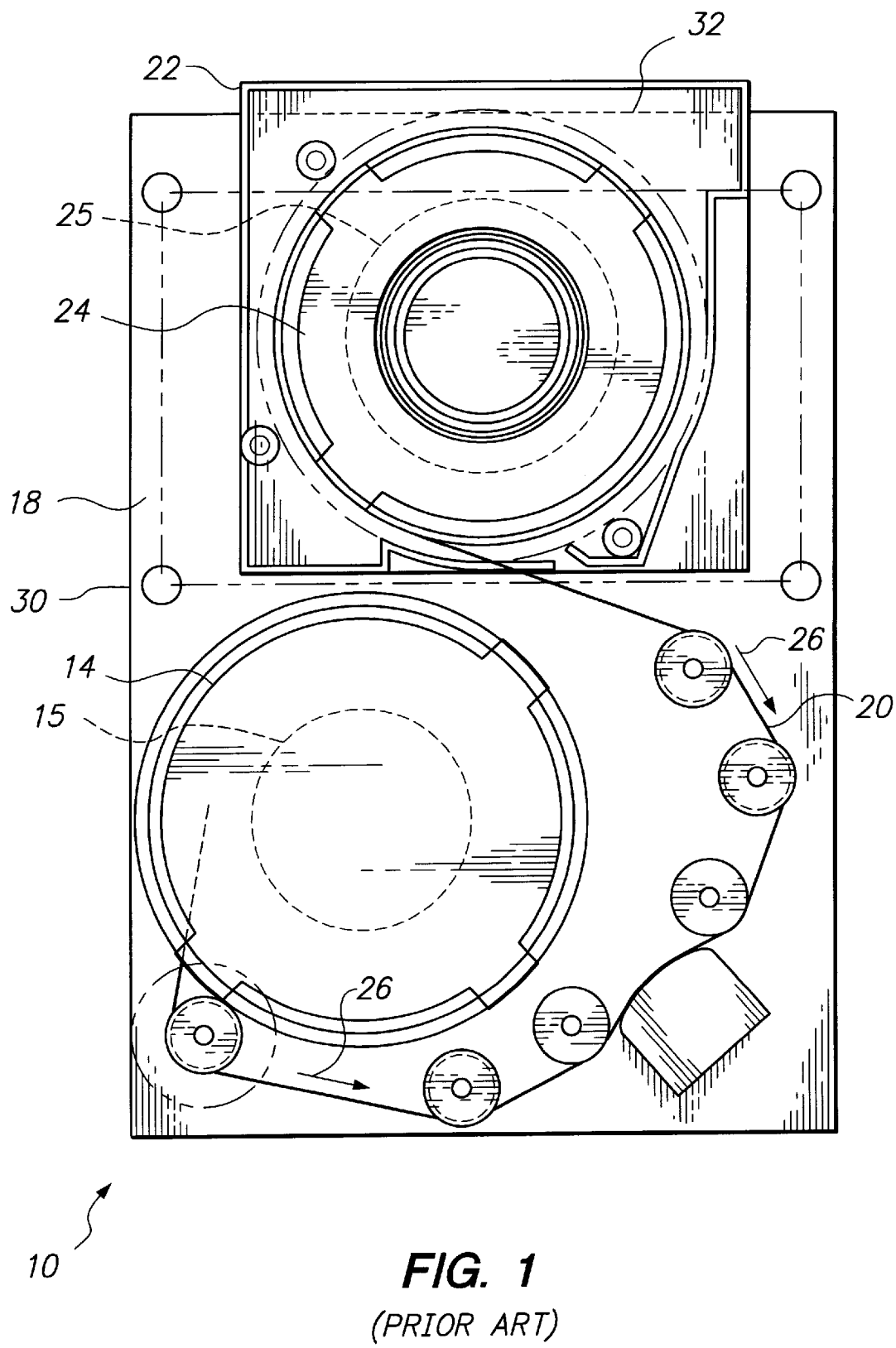
FIG. 1 is a conventional plan view of a magnetic tape drive (Prior Art)
Figure 2:
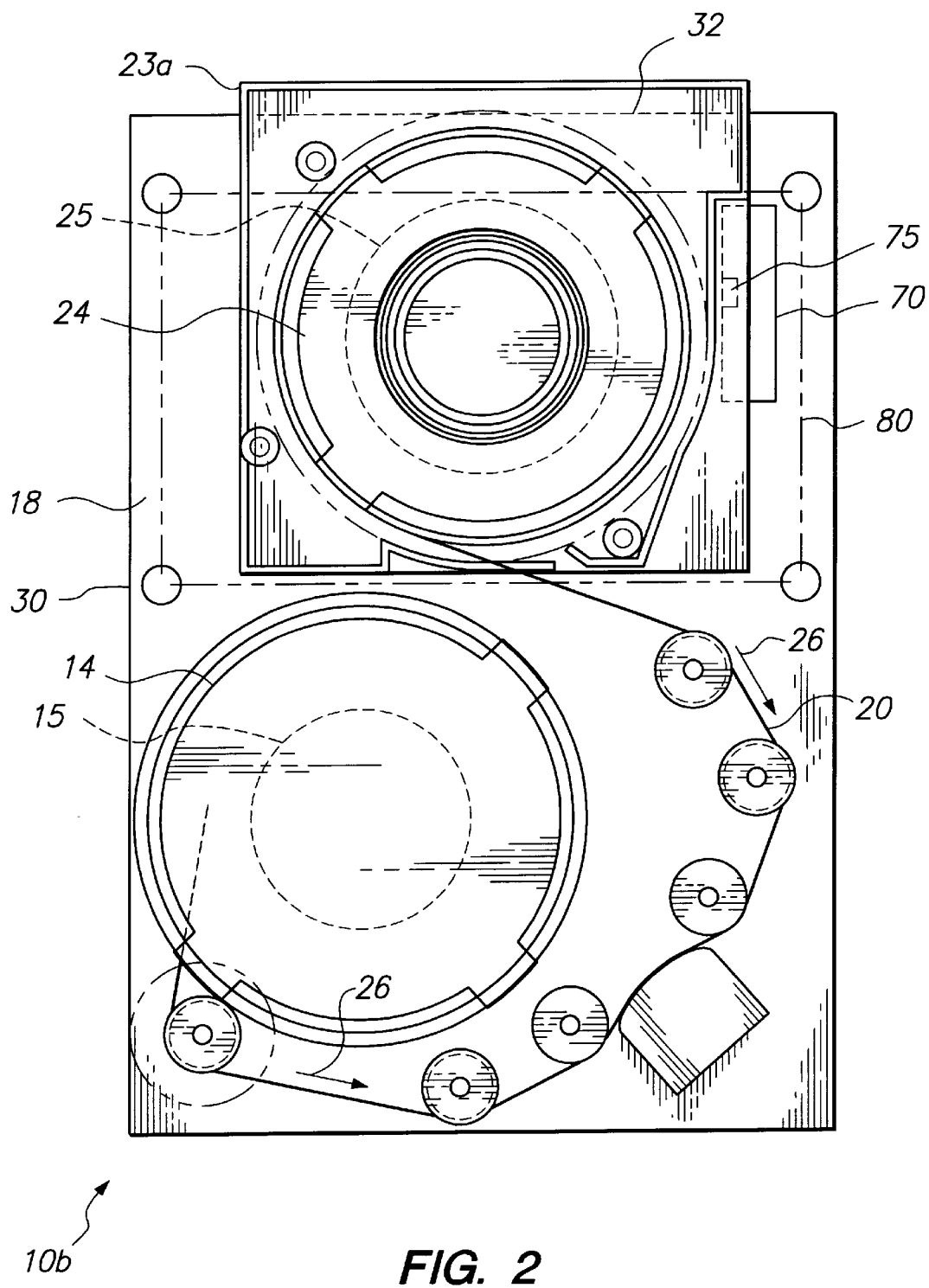
FIG. 2 is a plan view of a magnetic tape drive with a cartridge guide assembly and a magnetic tape cartridge as taught by a first embodiment of the present invention.

Referring to FIG. 2, one preferred embodiment of the present invention is a magnetic tape drive having a cartridge guide assembly 70 adapted to cooperate with a storage medium cartridge 23a having an integral key 75. In FIG. 2, elements which remain essentially unchanged from the previously discussed FIG. 1 example are assigned the same reference numerals. The cartridge guide assembly 70 is generally positioned adjacent to the tape drive slot 32. More precisely, the cartridge guide assembly 70 is defined within a magazine receiver 80 that is also defined within the tape drive 10b. This magazine receiver 80 is substantially rectangular and dimensioned to accept cartridge 23a therein. In one embodiment, the cartridge guide assembly 70 is a sub-assembly of the magazine receiver 80 and is attached by screws. Alternatively, the cartridge guide assembly 70 may be fixed in place by glue or epoxy resin. Preferably, the cartridge guide assembly 70 is formed as an integral portion of the magazine receiver 80.

Figure 3:
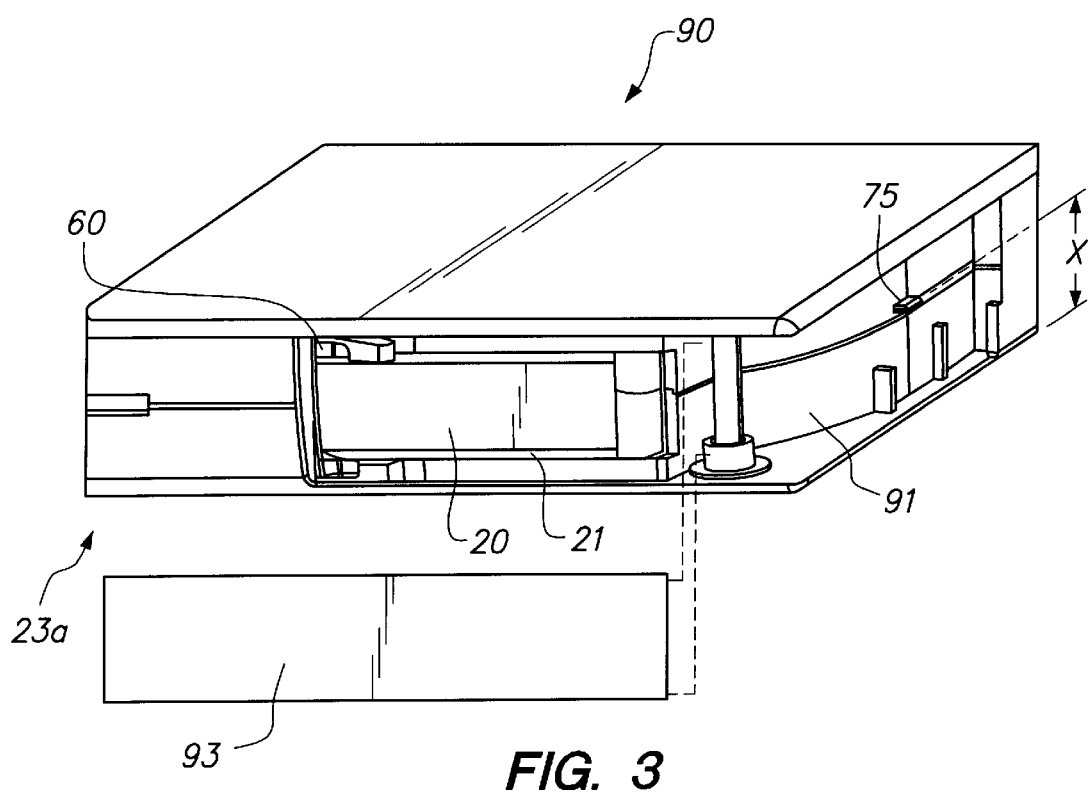
FIG. 3 is an isometric view of a magnetic tape cartridge showing a first embodiment of the present invention.

FIG. 3 illustrated a cartridge 23a embodying the first embodiment of the present invention. Cartridge 23a includes a substantially rectangular cartridge housing 90 that has a hollow interior cavity 21. Integral key 75 is formed on an exterior wall 91 of housing 90. Integral key 75 is a rectangular shaped tab that extends outwardly from cartridge housing 90. Alternatively, integral key 75 may be shaped in a number of geometries such as a raised bump or a protrusion, as long as the key extends outwardly from cartridge housing 90. Integral key 75 may be located in a plurality of positions on housing 90, different key locations indicating a different type of family of tape cartridge. In this embodiment, integral key 75 is positioned at a first vertical height position "X" indicative of a first family of cartridges. Similarly, if integral key 75 were positioned at a second "Y" and third "Z" vertical height positions these different heights would indicate second and third families of cartridges.

Storage medium cartridge 23a further includes a spool of magnetic tape 20 coiled about a supply spool 24 that is rotatably contained within the cartridge housing 90 and a pivotal door 93. The pivotal door 93 includes a locking mechanism (not shown) to maintain the door 93 in a locked position when the tape cartridge 23a is not in use.

Figure 4:
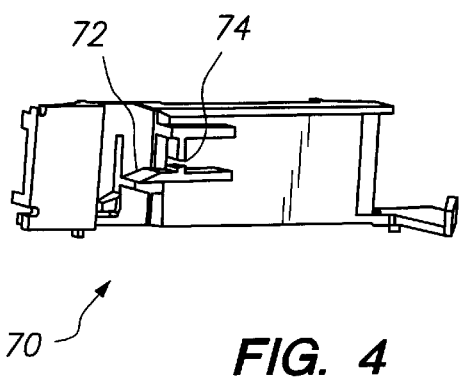
FIG. 4 is an isometric view of a tape cartridge guide assembly incorporated into the magnetic tape drive of FIG. 2.

FIG. 4 further illustrates the cartridge guide assembly 70 of FIG. 2. Cartridge guide assembly 70 includes a ramped portion 72 and a slit portion 74. The ramped portion 72 is dimensioned to engage and unlock the locking mechanism associated with the magnetic tape cartridge 23a. As a result of the ramped portion 72 unlocking the cartridge door 93, the door opens to expose the magnetic storage tape 20 contained therein. The slit portion 74 defined on the cartridge guide assembly 70 is dimensioned to enable integral key 75, which is defined on the cartridge housing 90, to enter and traverse the slit 74.

Generally during operation of the tape cartridge 23a, the cartridge 23a is manually or automatically partially inserted into the tape drive 10b. Upon partial insertion of the cartridge 23a into the subsystem 10b, the ramped portion 72 defined on the cartridge guide assembly 70 engages and unlocks the locking mechanism associated with the cartridge door 93 to expose the magnetic tape 20 contained therein. At the same time, the integral key 75 defined on the cartridge housing 90 is aligned with at least one slit portion 74 defined on the cartridge guide assembly 70. Thereafter, the integral key 75 is permitted to traverse the slit portion 74 thereof for enabling the cartridge 23a to fully enter the tape drive 10b. Next, the buckling component associated with the cartridge 23a is buckled with another buckling component associated with the take-up leader. Finally the tape cartridge 23a is permitted to stream magnetic tape 20 from the supply spool 24 contained therein to the take up spool 14 defined with the tape drive 10b.

FIG. 5, illustrates numerous views of a cartridge guide assembly 70b that includes a plurality of slit portions 74, 74b and 74c formed thereon. Generally, slit portion 74 accepts entry and traversal of the integral key 75 having the vertical height X, which is indicative of the first family of cartridges. Other families of cartridges (not shown) that include the integral key 75 having vertical heights of Y and Z can enter and traverse slits 74b and 74c respectively and as perhaps best illustrated in FIG. 5B.

Figure 5A:
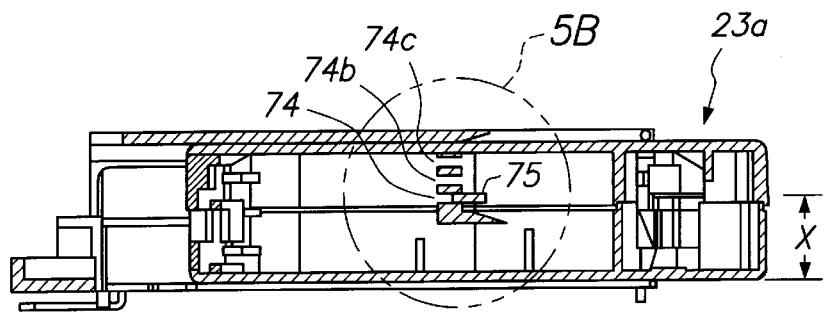
FIGS. 5(A)–5(D) illustrates an alternate embodiment of the cartridge guide assembly cooperating with an integral key on a cartridge.
Figure 5B:
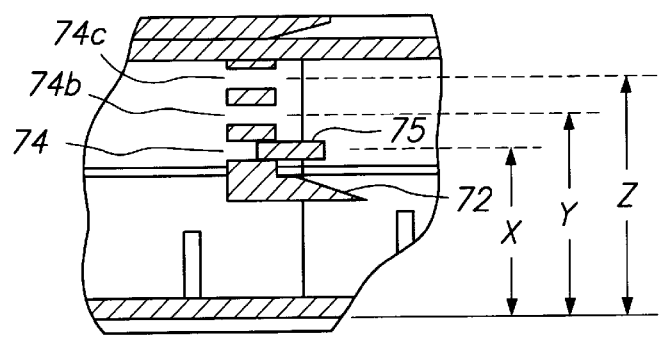
Figure 5C:
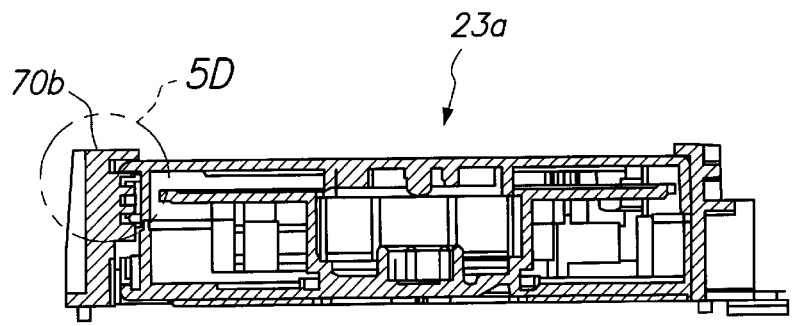
Figure 5D:
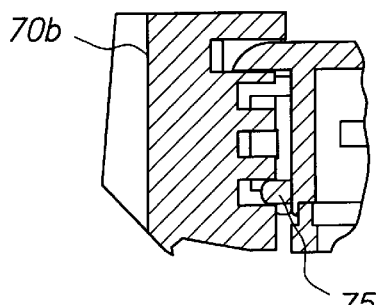

Specifically, FIG. 5A depicts a side view of the integral key 75, which is associated with the first family member cartridge 23a of the cartridge family 23, entering and traversing the first slit portion 74. FIG. 5B depicts a greatly enlarged area of the relevant portion of FIG. 5A to illustrate the integral key 75 traversing the first slit portion 74 defined on the cartridge guide assembly 70. Yet further, FIGS. 5C and 5D respectively show a rear view of the integral key 75 traversing the first slit portion 74 as well as a greatly enlarged view of the same.

Thus, according to one facet of the present invention, tape cartridge 23a (FIG. 2) is not permitted to be inserted into tape drive 10 (FIG. 1), because the integral key 75 (FIG. 3) formed on the housing 90 of cartridge 23a will not traverse the conventional cartridge guide assembly defined in tape drive 10. However, tape cartridge 23a is permitted to be inserted into tape drive 10b, because the integral key 75 defined on the cartridge housing 90 cooperates with the tape cartridge guide assembly 70 defined within the tape drive 10b to permit the tape cartridge 23a to be inserted into tape drive 10b.

The present invention permits the design of a tape library system (not shown) comprised of both older 10 and newer 10b tape drives without risk of a new tape cartridge 23a entering an old tape drive subsystem 10. Moreover, the tape library system can simultaneously employ both older tape cartridges 22 and newer tape cartridges 23a, the later having principles of the present invention, again without risk of a non-compatible cartridge entering a noncompatible subsystem. This feature is particularly advantageous in upgrading/retrofitting preexisting tape library systems with tape drives 10b and tape cartridges 23a.

The above described magnetic tape cartridge 23a having the minimal form factor modifications and including the integral key 75 fills the unmet need of allowing older tape cartridges 22 to be used in new tape drives 10b without the possibility of newer cartridges 23a being inserted into older tape drives 10. Consequently, problems associated with leader run away resulting from missed buckling and with data being overwritten or erased accidentally are reduced or eliminated.

Although described in detail only with respect to tape drives and tape cartridges, the keying feature could be used on the removable storage media of other magnetic disk drives and cartridges, optical disk drives and cartridges, or any other type of drive with a removable media. As design changes in these other drives may make new generation media incompatible with previous generation drives, the utility of the present invention in such environments is readily foreseeable.

What is claimed is:

1. A storage medium cartridge adapted for use with a tape drive, the tape drive including a locking fixture and a cartridge guide assembly that is adapted to receive and guide the movement of the cartridge within the tape drive, the cartridge comprising:

a cartridge housing;

an information storage medium rotatably contained within the cartridge housing; and a key rigidly secured to the cartridge housing, the key being sized, shaped and positioned to fit through the locking fixture to enable the cartridge to fully enter the tape drive.

2. The cartridge of claim 1, wherein the key is positioned at a predetermined vertical height on the exterior of the cartridge housing that is indicative of a cartridge family member and to facilitate cooperation with the cartridge guide assembly.

3. The cartridge of claim 1, wherein the cartridge further includes a pivotal door having a locking mechanism associated therewith, the locking mechanism engaginq the cartridge guide assembly for opening the pivotal door to expose the information storage medium.

4. The cartridge of claim 3, wherein the key fits through a slit in the cartridge guide assembly for enabling the cartridge to fully enter the tape drive.

5. The cartridge of claim 1, wherein the key is a raised feature extending outwardly from the cartridge housing.

6. The cartridge of claim 5, wherein the key is a rectangular tab.

7. The cartridge of claim 6, wherein the storage medium is a magneto-optical disk.

8. The cartridge of claim 6, wherein the storage medium is magnetic tape.

9. The cartridge of claim 6, wherein the storage medium is at least one rigid magnetic disk.

10. A magnetic tape cartridge adapted for use with a tape drive, the tape drive including a locking fixture and a cartridge guide assembly that is adapted to receive and guide the movement of the cartridge within the tape drive, the cartridge comprising:

a cartridge housing, the housing having a key rigidly secured to the cartridge housing, the key being sized, shaped and positioned to fit through the locking fixture;

at least one tape reel rotatably contained within the cartridge housing; and a spool of magnetic recording tape coiled about the tape reel;

wherein the cartridge is partially inserted into the tape drive such that the key fits into the locking fixture to enable the cartridge to fully enter the tape drive.

11. The cartridge of claims 10, wherein the integral key is positioned at a predetermined vertical height on the exterior of the cartridge housing that is indicative of a cartridge family member and to facilitate cooperation with the cartridge guide assembly.

12. The cartridge of claim 10, wherein the cartridge further includes a pivotal door having a locking mechanism associated therewith, the locking mechanism engaging the cartridge guide assembly for opening the pivotal door to expose the information storage medium.

13. The cartridge of claim 12, wherein the key fits through a slit in the cartridge guide assembly for enabling the cartridge to fully enter the tape drive.

14. The cartridge of claim 10, wherein the integral key is a raised feature extending outwardly from the cartridge housing.

15. The cartridge of claim 14, wherein the integral key is a rectangular tab.

16. The cartridge of claim 15, wherein the storage medium is a magneto-optical disk.

17. The cartridge of claim 15, wherein the storage medium is magnetic tape.

18. The cartridge of claim 15, wherein the storage medium is at least one rigid magnetic disk.

19. A combination comprising:

a tape drive including a cartridge guide assembly and a locking fixture, the cartridge guide assembly being adapted to receive and guide the movement of the cartridge within the tape drive; and a cartridge including a cartridge housing, a key, and a storage medium positioned within the cartridge housing, the key being rigidly secured to the cartridge housing and projecting away from the cartridge housing, the key being sized, shaped and positioned to fit through the locking fixture to enable the cartridge to fully enter the tape drive.

20. The combination of claim 19, wherein the cartridge further includes a pivotal door having a locking mechanism associated therewith, the locking mechanism engaging the cartridge guide assembly for opening the pivotal door to expose the information storage medium.

21. The combination of claim 20, wherein the cartridge guide assembly includes a slit portion, the slit portion aligning with the integral key to permit the key to fit through the slit portion of the cartridge guide assembly for enabling the cartridge to fully enter the tape drive.

* * * * *